Jan. 23, 1968   R. L. BUTTON ETAL   3,364,770
PERIODICALLY VARYING DRIVE MECHANISM
Filed Jan. 21, 1965

ROBERT L. BUTTON
BERNELL H. JOHNSON
INVENTORS.

BY

Townsend and Townsend

United States Patent Office 3,364,770
Patented Jan. 23, 1968

3,364,770
PERIODICALLY VARYING DRIVE MECHANISM
Robert L. Button, Rte. 1, Box 205, Winters, Calif.
95694, and Bernell H. Johnson, W. Kentucky Ave.,
Woodland, Calif. 95695
Filed Jan. 21, 1965, Ser. No. 426,894
6 Claims. (Cl. 74—394)

ABSTRACT OF THE DISCLOSURE

A shaker conveyor for conveying comestible bearing plants along a path and for shaking the plants to remove the comestibles therefrom, the shaking force being only in a direction parallel to conveyor movement to minimize bruising the comestibles. A mechanism for driving a conveyor or like load to effect compound motion having forward and rearward components with net forward movement.

This invention relates to a mechanism for rotatively driving a shaft at a periodically varying or compound rate to that the shaft accelerates and decelerates in a preselected repetitive time sequence.

The mechanism of the present invention is particularly suitable for driving an endless conveyor chain or belt of the type used in transporting vegetables such as tomatoes in a picking machine. Reference is made by way of example to United States Letters Patent No. 3,071,196 wherein there is disclosed a tomato harvester that includes apparatus for cutting tomato-bearing plants from a field and conveying such plants on an oscillating conveyor in order to shake the plants sufficiently to detach the tomatoes from the plants. In such machine after the tomatoes and plants are separated, they are transported to different sites. The mechanism of the present invention finds utility in such machine for driving the conveyor, in that the improved mechanism drives the conveyor in a periodically accelerating and decelerating mode with, however, a net forward translational movement.

An object of this invention is to provide a mechanism of the type described hereinabove wherein changes of rate and direction of shaft (and/or conveyor) movement are effected in a smooth substantially impact-free fashion. Accordingly, the elements constituting the mechanism are not subjected to fatigue-causing forces.

Although the present apparatus includes reciprocally driven parts, such parts are driven in approximate simple harmonic motion or angular harmonic motion so that the rate of movement of reciprocating elements is at a minimum when reversal of direction takes place. Such characteristics of the invention, in addition to preventing severe or excessive wear on the elements of the mechanism, minimizes the amount of power required to drive the mechanism.

Another feature and advantage of the present invention is that the specific nature of the compound movement produced can be established by choice of appropriate conventional elements or parts. For example, in a form of the invention wherein chains and sprockets are used as power train elements, correct selection of sprocket sizes affords virtually any desired pattern of compound motion.

The embodiment to be described in detail hereinafter includes a power shaft that is driven by any suitable constant speed prime mover and a driven shaft mounted for rotation on a common axis with the power shaft. Mounted for pivotal movement on the common axis of the two shafts is a rocker frame assembly that is pivotally reciprocally driven in angular harmonic motion by a crank arm and connecting rod assembly. The rocker frame carries a shaft parallelly spaced from the axis of pivotal movement. On the last mentioned shaft are a pair of sprockets that form elements of the power train between the power shaft and the driven shaft. Each such sprocket is aligned with an associated sprocket on the power shaft and driven shaft. Chains are provided for linking the sprockets to one another. Rotative power from the power shaft is thereby transmitted through the chains and sprockets to the driven shaft. A varying amount of force is periodically added to and substracted from such rotative power by periodic pivotal reciprocation of the rocker frame. Accordingly, the net rotative movement imparted to the driven shaft varies at a periodic rate that is established by the rate of reciprocation.

Other objects, features, advantages and characteristics of the present invention will be more apparent after referring to the following specification and accompanying drawings in which.

Figure 1:
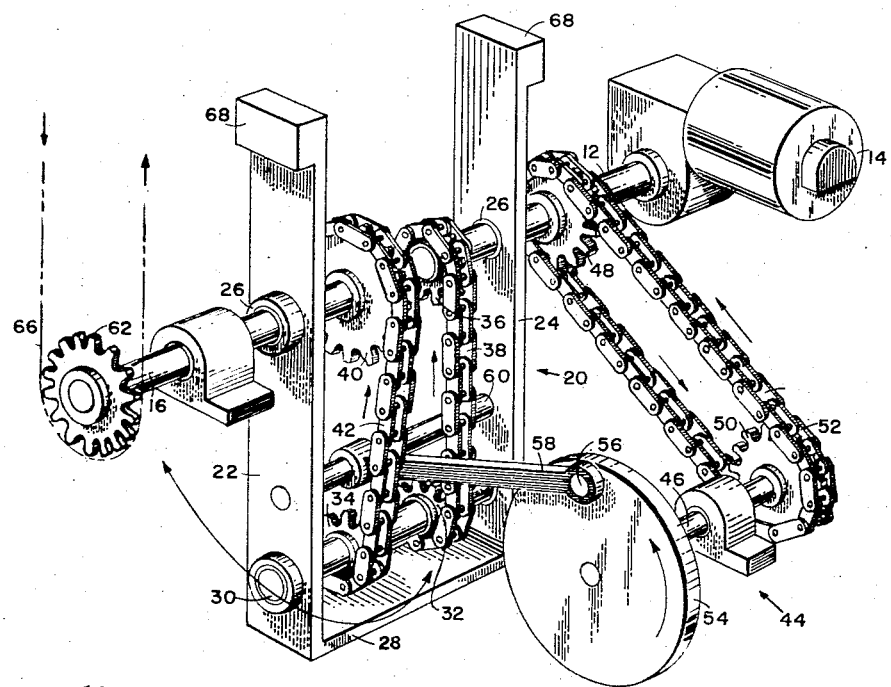
FIG. 1 is a perspective view of one satisfactory form of the present invention.

Referring more particularly to the drawings, reference numeral 12 indicates a driving shaft rotatively powered by a motor or like prime mover, schematically indicated at 14. Typically, shaft 12 is rotated at a constant speed. Journaled for rotation about an axis common with driving shaft 12 is a driven shaft 16. Any suitable load, such as endless chain conveyor 18 (FIG. 2), is operatively connected to shaft 16.

A rocker frame 20 is mounted for pivotal movement with respect to the common axis of shafts 12 and 16. The rocker frame includes elongate members 22 and 24 which are provided with bushings 26 for pivotally supporting the frame with respect to shafts 12 and 16. A cross plate 28 extends between arms 22 and 24 for imparting rigidity to rocker frame 20. An idler shaft 30 is carried by rocker frame 20 for rotation about an axis parallel to and spaced from the common axis of shafts 12 and 16. Mounted on idler shaft 30 is a pair of sprockets 32 and 34 that are suitably mounted for rotation with one another, for example by being keyed to the idler shaft. Affixed to shaft 12 for rotation therewith is a sprocket 36 in alignment with sprocket 32. A chain 38 is provided between sprockets 32 and 36 for transmitting power therebetween.

Secured to shaft 16 and in alignment with sprocket 34 is a driven sprocket 40. Operatively interconnecting sprockets 34 and 40 is chain 42. Accordingly, it will be understood that power from motor 14 will be transmitted to driven shaft 16 through shaft 12, sprocket 36, chain 38, sprocket 32, shaft 30, sprocket 34, chain 42 and sprocket 40. It will be noted that a speed change is effected between shaft 12 and 16, in this particular instance by the relatively large diameter of sprocket 40 with respect to sprocket 36. Such speed change is necessary so that upon pendulous or rocking movement of rocker frame 20, differential movement between shafts 12 and 16 occurs.

A driving subassembly 44 is included in the mechanism for imparting periodic pivotal reciprocal movement to rocker frame 20 and to the elements carried thereby. The subassembly includes a counter-shaft 46 driven from power shaft 12 through aligned sprockets 48 and 50 and a chain 52 extending between the sprockets for transmitting power therebetween. Secured to counter-shaft 46 is a disc 54 that has extending therefrom a crank pin 56 disposed eccentrically of the counter-shaft. Accordingly, disc 54 and crank pin 56 define a crank arm. One end of a connecting rod 58 is mounted on crank pin 56; the other end of connecting rod 58 is secured to rocker frame 20, for example, by a cross-bar 60 extending between legs 22 and 24 of the rocker frame. It will now be understood that rotation of disc 54 effects periodic rocking or pivotal reciprocal movement of rocker frame 20 and that a point on the rocker frame will be driven in angular harmonic or pendulous motion in response to rotation of disc 54. Such motion is characterized by a rapid rate of movement at or near the central region of movement, and a slow rate of movement at the extreme or end region of movement. Because reversal of direction occurs at the latter region, abrupt forces on rocker frame 20 and the drive train carried thereby are avoided.

Figure 2:
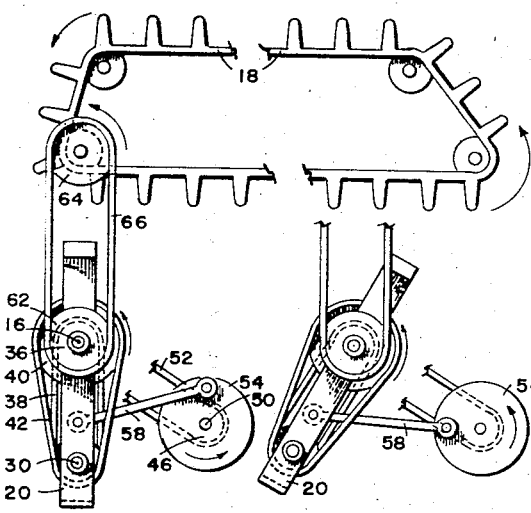
FIG. 2 is a diagrammatic view of the improved mechanism shown in association with an endless conveyor.

An exemplary load, shown by endless conveyor 18 in FIG. 2, is driven by the mechanism through a sprocket 62 mounted on shaft 16, a sprocket 64 mounted in driving relation to the conveyor 18, and a chain 66 extending between the last-named sprockets. In order to promote dynamic balance of the mechanism, rocker frame 20 is provided with balance weights 68.

The operation of our improved mechanism is as follows. Motor 14 is energized to drive shaft 12 which in turn drives shaft 16 through chains 38 and 42 and their associated sprockets. In the part of the cycle of operation of rocking frame 20 depicted in FIG. 2, the rate of pivotal movement of the frame is at a maximum since connecting rod 58 is being driven leftwardly at a maximum rate. Such movement of rocker frame 20 is imparted to the peripheries of sprockets 32 and 34 in a sense or direction opposite that imparted by motor 14. Consequently, the net rotative speed of shaft 16 during the period of operation depicted by FIG. 2 is at a minimum.

Figures 3A, 3B, 3C:
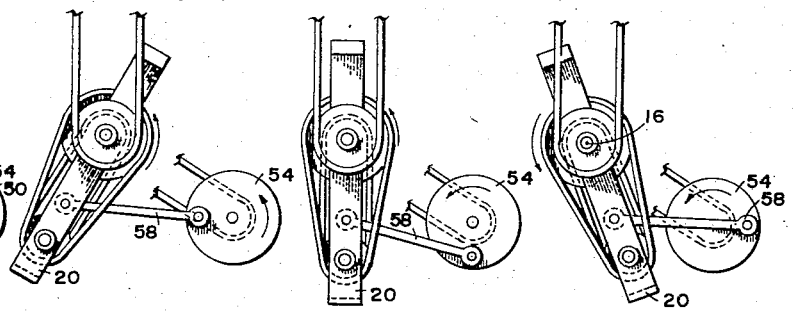
FIGS. 3a, 3b and 3c are diagrammatic views of the mechanism at different positions and times during one cycle of operation of the mechanism.

Upon 90° rotation of disc 54, the mechanism resides in a position depicted at FIG. 3a. In this position the pivotal movement of rocker frame 20 has ceased because the direction of pivotal movement is going through reversal. At such stage in the cycle of operation, shaft 16 is rotating at a rate determined solely by the speed of rotation of shaft 12 and the speed change effected in the sprockets. That is to say, in a position of the mechanism shown in FIG. 3a, rocker frame 20 being in a momentary quiescent state does not contribute to the rotative speed of shaft 16.

As disc 54 continues to rotate toward the position shown in FIG. 3b, the rate of pivotal movement of the rocker frame increases, as a consequence of which a correspondingly increasing component of force is added to the rotation of shaft 16. When disc 54 is in the position shown in FIG. 3b, such added component is at a maximum and at that point shaft 16 is driven at a maximum rotative rate.

As disc 54 rotates in its next 90° of operation, i.e. between the positions shown in FIGS. 3b and 3c, the component of rotation added by the rocking movement of frame 20 gradually decreases so that at the position of the disc shown in FIG. 3c shaft 16 is rotating at the speed dictated by shaft 12 and the sprocket-chain power train, and independently of rocker frame 20, the rocker frame being momentarily stationary.

An additional 90° of rotation of disc 54 from the position shown in FIG. 3c to the position shown in FIG. 2 will effect a slowing down of the rotation of shaft 16 and the cycle of operation will be repeated.

Certain characteristics of the improved mechanism will be observed by those skilled in the art. For example, the rate of horizontal movement of connecting rod 58 varies with time as the sine of an angle included between a radial from shaft 56 to crank pin 56 and a horizontal line. Therefore, in the position of disc 54 shown in FIGS. 2 and 3b, the last-mentioned angle is 90° and the sine of the angle is accordingly at a minimum. Because rocker frame 20 reverses direction of movement at the positions of FIGS. 3a and 3c and because the rate of travel is there at a minimum, abrupt reversal of direction is avoided; wear and fatigue on the elements are thereby minimized.

By selection of appropriate dimensions and sprocket sizes, virtually any pattern of motion can be imparted to driven shaft 16. By way of example, if it is desired to effect a momentary cessation or reversal of direction of rotation of driven shaft 16, the speed of linear movement of a point on rocker frame 20 at the level of idler shaft 30 is driven at a rate equal to or in excess of the rate of linear movement of chain 42. For example, in one mechanism designed according to the present invention, the maximum rate of arcuate movement of idler shaft 30 caused by pivotal movement of rocker frame 20 is 84.5 feet per minute whereas the linear speed of chain 42 caused by transmission of power from motor 14 through the drive train is about 81.2 feet per minute. Thus, when the rocker frame is moving at its maximum linear rate, it exceeds that of chain 42 during which time the direction of rotation of shaft 16 reverses. Of course, when the linear speed of the rocker frame is exactly equal to the linear speed of chain 42 and in a direction opposite thereto, shaft 16 is momentarily quiescent.

The specilc mechanism referred to above has the following operating parameters:

| | |
|---|---:|
| Speed of rotation of shaft 12 _____r.p.m__ | 104 |
| Ratio of reduction effected by the chain-sprocket drive train _____ | 15/36 |
| Speed of shaft 46 _____r.p.m__ | 102 |
| Length of the crank arm from shaft 46 to crank pin 56 _____in__ | 3 |
| Distance from bushings 26 to rod 60 _____in__ | 6 |
| Distance from rod 60 to idler shaft 30 __in____ | 3½ |
| Maximum rotative speed of shaft 16 (FIG. 3b) _____r.p.m__ | 88 |
| Mean rotative speed of shaft 16 (FIGS. 3a and 3c) _____r.p.m__ | 43 |
| Minimum rotative speed of shaft 16 (FIG. 2) _____r.p.m__ | −1.75 |
| Mean speed of conveyor chain 18 __ft. per min__ | 49 |
| Maximum speed of conveyor chain 18 ___do____ | 100 |
| Minimum speed of conveyor chain 18 ___do____ | −2 |

Although the specific example of the mechanism of the present invention utilized a sprocket-chain drive train including ⅝ inch pitch chain, those skilled in the art will appreciate a pulley-belt drive train can be used as can a gear drive train so long as at least one element of the drive train is mounted for rotation about an axis fixed with respect to rocker frame 20 and has a periphery to which tangentially directed force is imparted from the drive train so that the reciprocal pivotal or rocking movement of the frame is imparted to the drive train.

Although the mechanism of the present invention is particularly suitable for driving an endless conveyor wherein compound motion with a net forward translational movement, it will be obvious that the mechanism has a myriad of other patterns of operations. Moreover, by judicious selection of the relative sizes of the elements in the drive train and the frequency of rocking of frame 20, virtually any form of vibratory/translational motion can be provided.

Although one embodiment of the present invention has been shown and described, it will be apparent that other adaptations and modifications can be made without departing from the true spirit and scope of the invention.

What is claimed is:

1. Apparatus for generating periodically varying rotary motion comprising a first shaft, means for rotatively driving said first shaft at a substantially constant speed, a second shaft journaled for rotation about a common axis with said first shaft and being axially spaced therefrom, a rocker frame supported for pivotal movement about said common axis, an idler shaft journaled in said rocker frame in parallel spaced relation to said common axis, first and second generally circular members affixed to said idler shaft concentric thereto, means for operatively connecting said first circular member to said first shaft so that rotary motion of said shaft is transmitted to said circular member tangentially thereof, means for operatively connecting said second circular member to said second shaft so that rotary motion of said shaft is transmitted to said circular member tangentially thereof, and means for periodically reciprocally rocking said frame about said common axis so said second shaft is driven at a periodically varying rate of rotary motion, said frame rocking means comprising a counter shaft journaled for rotation in spaced relation to said first shaft, means for rotatively driving said counter shaft in response to rotation of said first shaft, a crank arm carried by said counter shaft and rotatively driven thereby, and a connecting rod extending from said crank arm to said frame so that said frame is periodically rocked in response to rotation of said crank arm.

2. Apparatus for generating periodically varying rotary motion comprising a first shaft, means for rotatively driving said first shaft at a substantially constant speed, a second shaft journaled for rotation about a common axis with said first shaft and being axially spaced therefrom, a rocker frame supported for pivotal movement about said common axis, an idler shaft journaled in said rocker frame in parallel spaced relation to said common axis, first and second sprockets mounted on said idler shaft, a driving sprocket mounted on said first shaft, a chain operatively connecting said driving sprocket to said first sprocket, a driven sprocket mounted on said second shaft, a chain operatively connecting said driven sprocket to said second sprocket, at least one of said sprockets having a diameter different from the other said sprockets so that the rotative speed of said second shaft is different from said first shaft, and means for periodically reciprocally rocking said frame in approximate angular harmonic motion.

3. In combination with an endless article conveyor, apparatus for driving the conveyor at a periodically varying rate and a net forward translational movement comprising first and second shafts mounted in axially spaced apart relation and for rotation about a common axis, means for operatively connecting said second shaft to the article conveyor, means for driving said first shaft at a substantially constant rotative speed, a rocker frame mounted intermediate said shafts for pivotal movement about the common axis of rotation thereof, an idler shaft journaled for rotation in said rocker frame about an axis parallel to and spaced from said common axis, first and second sprockets mounted on said idler shaft, a driving sprocket mounted on said first shaft, a chain extending between said driving and first sprockets for transmitting power therebetween, a driven sprocket mounted on said second shaft, a chain extending between said driven and second sprockets for transmitting power therebetween, means for periodically rocking said frame in approximate angular harmonic motion, said frame rocking means being so constructed that the speed of said frame at maximum is at least equal to the rate of movement of the periphery of said second sprocket.

4. Apparatus according to claim 3 wherein said frame rocking means includes a counter shaft journaled for rotation about an axis parallel to and spaced from said first axis, means operatively connecting said counter shaft to said first shaft so that said counter shaft is rotatively driven in response to said first shaft, an elongate rod having a first end pivotally secured to said frame and a second end remote from said first end, and means for mounting said second rod end eccentrically of said counter shaft so that said first rod end moves in reciprocation in response to rotation of said counter shaft.

5. Apparatus for driving a shaft in periodically varying rotary motion comprising a frame mounted for pivotal movement about an axis coextensive with the axis of said shaft, a first sprocket carried on said frame for rotation relative thereto, a second sprocket mounted on said shaft in alignment with said first sprocket, a chain rotatively operatively interconnecting said sprockets, means for rotatively driving said first sprocket so as to drive said chain, and means for periodically pivotally rocking said frame about said axis so as to periodically add to and subtract from the velocity at which said chain drives said second sprocket.

6. A shaker conveyor for simultaneously transporting tomato bearing plants along a horizontal path and shaking the plants to separate the tomatoes therefrom comprising an endless conveyor, means for supporting said conveyor with the upper reach constrained to a generally horizontal plane, a member mounted in driving relation to said conveyor, means for driving said member in compound motion forwardly and rearwardly with a net forward movement, said driving means comprising a first sprocket drivably connected to said member, a frame mounted for pivotal movement about the axis of rotation of said first sprocket, a second sprocket carried on said frame for rotation relative thereto, a chain rotatively operatively interconnecting said sprockets, means for rotatively driving said second sprocket so as to drive said chain, and means for periodically pivotally rocking said frame about said axis so as to alternately add to and subtract from the velocity at which said chain drives said first sprocket.

References Cited
UNITED STATES PATENTS

| Re. 20,675 | 3/1938 | Todd | 198—110 X |
| 2,301,543 | 11/1942 | Hlavaty | 74—117 |
| 2,399,493 | 4/1946 | Luehrs et al. | 74—394 |
| 2,587,959 | 3/1952 | Biner | 198—32 |
| 2,748,616 | 6/1956 | Foster et al. | 74—394 |
| 3,076,351 | 2/1963 | Moss | 74—394 |
| 3,127,177 | 4/1964 | Pietsch | 74—394 X |

DONLEY J. STOCKING, *Primary Examiner.*

DAVID J. WILLIAMOWSKY, *Examiner.*

L. H. GERIN, *Assistant Examiner.*